United States Patent
Jimenez Tarodo et al.

(10) Patent No.: US 12,024,837 B2
(45) Date of Patent: Jul. 2, 2024

(54) RAILWAY WEED CONTROL VEHICLE

(71) Applicant: DISCOVERY PURCHASER CORPORATION, Wilmington, DE (US)

(72) Inventors: Sergio Jimenez Tarodo, Düsseldorf (DE); Michael Kilian, Leverkusen (DE); James Hadlow, Newmarket (GB); Virginie Giraud, Ecully (FR); Thomas Arians, Rommerskirchen (DE)

(73) Assignee: DISCOVERY PURCHASER CORPORATION, Wilmington, DE (US)

( * ) Notice: Subject to any disclaimer, the term of this patent is extended or adjusted under 35 U.S.C. 154(b) by 896 days.

(21) Appl. No.: 17/055,380

(22) PCT Filed: May 2, 2019

(86) PCT No.: PCT/EP2019/061206
§ 371 (c)(1),
(2) Date: Nov. 13, 2020

(87) PCT Pub. No.: WO2019/219394
PCT Pub. Date: Nov. 21, 2019

(65) Prior Publication Data
US 2021/0222385 A1    Jul. 22, 2021

(30) Foreign Application Priority Data
May 14, 2018  (EP) .................................... 18172063

(51) Int. Cl.
*E01H 11/00*    (2006.01)
*E01H 8/10*    (2006.01)
(Continued)

(52) U.S. Cl.
CPC ............... *E01H 11/00* (2013.01); *E01H 8/10* (2013.01); *E01H 8/105* (2013.01); *E01H 8/125* (2013.01); *E01B 31/20* (2013.01)

(58) Field of Classification Search
CPC ........... E01H 11/00; E01H 8/10; E01H 8/105; E01H 8/125; E01B 31/20; A01M 21/046
(Continued)

(56) References Cited

U.S. PATENT DOCUMENTS 1,832,030 A * 11/1931 Kirkland ................. E01H 11/00
239/173
2,484,443 A * 10/1949 Baker ................. A01M 21/046
47/1.3
(Continued)

FOREIGN PATENT DOCUMENTS

CA        2956489 A1 *  2/2016  ............... A01H 3/04
CN       106320113 A  *  1/2017
(Continued)

*Primary Examiner* — Zachary L Kuhfuss
*Assistant Examiner* — James William Jones
(74) *Attorney, Agent, or Firm* — McBee Moore & Vanik, IP, LLC

(57) ABSTRACT

The present invention relates to a railway weed control vehicle. It is described to activate (110) at least one weed control unit to control weeds along and around a railway track. The railway track comprises rails and sleepers. The at least one electrode based weed control unit is mounted at at least one first position of the vehicle. Sensor data is acquired (120) by at least one sensor. The sensor data relates to at least one location along and around the railway track. The at least one sensor is mounted at at least one second position of the vehicle. With respect to a forward movement direction of the vehicle the at least one second position is in front of the at least one first position. The sensor data is provided (130) to a processing unit. The sensor data is analysed (140) by the processing unit to determine locations of rail infra- (Continued)

structure components in addition to the rails and sleepers. The processing unit modifies (150) activation of one or more electrode based weed control units of the at least one electrode based weed control unit comprising utilisation of at least one location of the determined locations of the rail infrastructure components.

12 Claims, 3 Drawing Sheets

(51) Int. Cl.
  *E01H 8/12* (2006.01)
  *E01B 31/20* (2006.01)
(58) Field of Classification Search
  USPC ........................................................ 104/279
  See application file for complete search history.

(56) References Cited

U.S. PATENT DOCUMENTS

| | | | | |
|---|---|---|---|---|
| 4,177,603 | A * | 12/1979 | Dykes | A01M 21/046 47/1.3 |
| 6,010,079 | A * | 1/2000 | Mayfield, Jr. | A01M 7/0014 239/165 |
| 11,492,770 | B2 * | 11/2022 | Bassfeld | B05B 9/0423 |
| 2006/0265946 | A1 * | 11/2006 | Schwager | A01M 21/046 47/1.3 |
| 2015/0027044 | A1 * | 1/2015 | Redden | A01G 7/06 47/58.1 R |
| 2017/0202202 | A1 * | 7/2017 | Crisp | A01M 19/00 |
| 2019/0136462 | A1 | 5/2019 | Buerger et al. | |
| 2019/0223428 | A1 | 7/2019 | De Andrade Coutinho Filho et al. | |

FOREIGN PATENT DOCUMENTS

| | | | | |
|---|---|---|---|---|
| DE | 4132637 | A1 | 4/1993 | |
| DE | 4140553 | A1 | 6/1993 | |
| DE | 19730247 | C1 * | 12/1998 | ............ E01H 11/00 |
| FR | 2473265 | A1 * | 7/1981 | |
| JP | H07-170899 | A | 7/1995 | |
| JP | 2001-346496 | A | 12/2001 | |
| WO | WO-9917606 | A1 * | 4/1999 | ......... A01M 7/0089 |
| WO | WO-2005047819 | A1 * | 5/2005 | ............ B61L 23/041 |
| WO | WO-2006117581 | A1 * | 11/2006 | ............ A01M 21/04 |
| WO | 2017215777 | | 12/2017 | |
| WO | WO-2018050138 | A1 * | 3/2018 | ............ A01M 17/00 |
| WO | WO-2018050142 | A1 * | 3/2018 | .......... A01M 21/046 |
| WO | WO-2018050143 | A2 * | 3/2018 | .......... A01M 21/046 |

* cited by examiner

RAILWAY WEED CONTROL VEHICLE

CROSS-REFERENCE TO RELATED APPLICATIONS

This application is a U.S. national stage filing under 35 U.S.C. § 371 of International Application No. PCT/EP2019/061206, filed on May 2, 2019, which claims the benefit of and priority to European Application No. 18172063.2, filed on May 14, 2018. The entire disclosure of each of the above applications is incorporated herein by reference.

FIELD OF THE INVENTION

The present invention relates to a railway weed control vehicle, and to a method of controlling weeds with a railway weed control vehicle, as well as to a computer program element and a computer readable medium.

BACKGROUND OF THE INVENTION

The general background of this invention is weed control. Areas around and between railway tracks need to have the vegetation controlled. Such control improves visibility from the perspective of people on the train such as the driver and improves visibility from the perspective of people working on the tracks. Such control can lead to improved safety. Additionally, vegetation can disrupt or damage tracks and associated signaling and communication lines. Control of the vegetation is then required to mitigate this. Vegetation control, also called weed control, can be very time and resource consuming, especially if carried out manually. There is a need to reduce the environmental impact of chemical sprays frequently used for weed control. Electrode based weed control technologies has been proposed to control weeds, with high voltage being applied between electrodes and the current passing from one electrode to the other via the ground and weeds killing the weeds. However, the environment where weeds are to be controlled can pose difficulties, having infrastructure components that can be damaged by such electrode based weed control units.

SUMMARY OF THE INVENTION

It would be advantageous to have improved weed control technology based on an electrode based weed control technology.

The object of the present invention is solved with the subject matter of the independent claims, wherein further embodiments are incorporated in the dependent claims. It should be noted that the following described aspects and examples of the invention apply also for the railway weed control vehicle, the method of controlling weeds with a railway weed control vehicle, and for the computer program element and the computer readable medium.

According to a first aspect, there is providing a railway weed control vehicle, comprising:

at least one electrode based weed control unit;
at least one sensor; and
a processing unit.

The at least one electrode based weed control unit is mounted to at least one first position of the vehicle. The at least one sensor is mounted to at least one second position of the vehicle. With respect to a forward movement direction of the vehicle the at least one second position is in front of the at least one first position. Activation of the at least one weed control unit is used to control weeds along and around a railway track. The railway track comprises rails and sleepers. The at least one sensor is configured to acquire sensor data relating to at least one location along and around the railway track. The at least one sensor is configured to provide the sensor data to the processing unit. The processing unit is configured to analyze the sensor data to determine locations of rail infrastructure components in addition to the rails and sleepers. The processing unit is configured to modify activation of one or more electrode based weed control units of the at least one electrode based weed control unit comprising utilization of at least one location of the determined locations of the rail infrastructure components.

In this way, sensitive infrastructure parts and components in a railway environment are not damaged, through either contacting the electrodes of an electrode based weed control unit of a train and/or having high voltage applied in the vicinity of the parts or components. Thus, sensor data is utilized to enable weed control along a railway track using electrode based weed control units to automatically control weeds, even where sensitive infrastructure components are parts are located, because appropriate action is automatically undertaken to ensure that such sensitive parts and components are not damaged.

In an example, modification of activation of the one or more electrode based weed control unit comprises deactivation of the one or more electrode based weed control units.

In this manner, the electrodes are in effect switched off to ensure that a high voltage and accompanying current that passes through the ground does not occur where the sensitive infrastructure components are located.

In an example, modification of activation of the one or more electrode based weed units comprises a determination not to activate the one or more electrode based weed control units.

Thus, for example when the electrode weed control units are passing over an area where there are no weeds, the processing unit on the basis of sensor data can determine that there are no weeds and the weed control units not be activated. Then, and area with weeds can be encountered and on the basis of sensor data the weed control units may normally be activated to control the weeds. However, on the basis of sensor data the processing unit can determine that in that area in addition to the weeds there is sensitive infrastructure components and the decision can be made not to activate the weed control units because such activating could damage that infrastructure.

In an example, modification of activation of the one or more electrode based weed control units comprises a movement of the one or more electrode based weed control units away from the at least one location of the determined locations.

In this manner, physical contact of the electrode based weed control units with sensitive infrastructure can be mitigated by moving the units away from the infrastructure components. The movement can be conducted when the units are still activated or can be accompanied with a deactivation of the units. The movement can be vertical, to move the units over the infrastructure components, horizontal to move the units around the infrastructure components, or a combination of horizontal and vertical movement. When the movement is horizontal, if the movement leads to the units remaining over weeds or leads to movement such that the units are now over weeds then maintaining activation in terms of maintaining the high voltage and current application enables these weeds to be controlled, thereby providing efficiency of weed control.

In an example, the movement comprises a vertical movement.

In an example, the movement comprises a horizontal movement.

In an example, each electrode based weed control unit is movably attached to the vehicle via an associated actuator, and wherein the processing unit is configured to control an actuator to move the associated electrode based weed control unit.

In an example, the processing unit is configured to analyze the sensor data to identify the rail infrastructure components at the determined locations. The at least one location of the determined locations comprises at least one location of an identified rail infrastructure component is susceptible to damage from activation of an electrode based weed control unit.

In this manner, the decision to modify the activation of the electrode based weed based technology, by for example having the unit not activating when in the vicinity of infrastructure components and/or moving over or around those components is based on what those components are. Thus, identified infrastructure components that are robust with respect to physical contact and high voltage application can be identified and the weed control units can operate as normal in their vicinity to control weeds. However, infrastructure components such as cables or electronic or electrical systems that could be damaged due to physical contact with the electrodes of and/or high voltage application from the units, can be identified and the decision can be made to move the electrodes over the components and/or not have the electrodes activating in the vicinity. However, robust components that would not be damaged, may be large enough to damage the electrode based weed control units themselves. Thus, in this case activation of the units can again be modified, through for example movement of the units vertically and/or horizontally in order that the electrodes do not hit the robust infrastructure component.

In an example, the sensor data comprises image data, and wherein identification of the rail infrastructure components comprises image analysis of the image data.

In an example, the at least one sensor comprises one or more of: a camera; an IR sensor; a LIDAR sensor; a flexible contact sensor; and a radar sensor.

According to a second aspect, there is provided a method of controlling weeds with a railway weed control vehicle, comprising:

a) activating at least one weed control unit to control weeds along and around a railway track, wherein the railway track comprises rails and sleepers, and wherein the at least one electrode based weed control unit is mounted to at least one first position of the vehicle;

b) acquiring sensor data by at least one sensor, sensor data relating to at least one location along and around the railway track, wherein the at least one sensor is mounted to at least one second position of the vehicle, and wherein with respect to a forward movement direction of the vehicle the at least one second position is in front of the at least one first position;

c) providing the sensor data to a processing unit;

d) analyzing the sensor data by the processing unit to determine locations of rail infrastructure components in addition to the rails and sleepers; and e) modifying by the processing unit activation of one or more electrode based weed control units of the at least one electrode based weed control unit comprising utilization of at least one location of the determined locations of the rail infrastructure components.

In an example, step e) comprises deactivation of the one or more electrode based weed control units.

In an example, step e) comprises a movement of the ono or more one or more electrode based weed control units away from the at least one location of the determined locations.

According to another aspect, there is provided a computer program element for controlling parts of the vehicle of the first aspect, which when executed by a processor is configured to carry out the method of the second aspect. There is also provided a computer readable medium having stored the program element.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
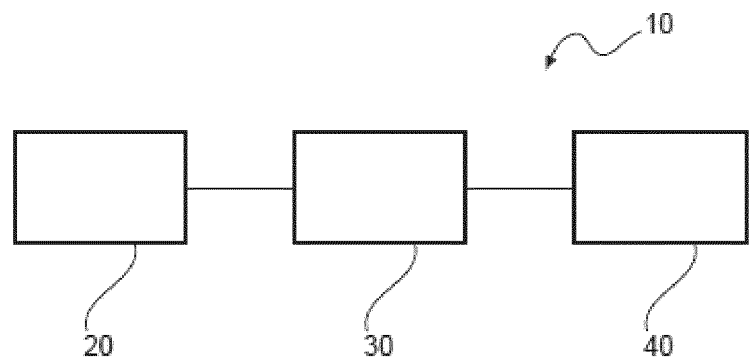
FIG. 1 shows a schematic set up of an example of a railway weed control vehicle.

FIG. 1 shows an example of a railway weed control vehicle 10. The vehicle comprises at least one electrode based weed control unit 20, at least one sensor 30, and a processing unit 40. The at least one electrode based weed control unit 20 is mounted to at least one first position of the vehicle 10. The at least one sensor 30 is mounted to at least one second position of the vehicle 10. With respect to a forward movement direction of the vehicle 10 the at least one second position is in front of the at least one first position. Activation of the at least one weed control unit 20 is used to control weeds along and around a railway track. The railway track comprises rails and sleepers. The at least one sensor 30 is configured to acquire sensor data relating to at least one location along and around the railway track. The at least one sensor 30 is configured to provide the sensor data to the processing unit 40. The processing unit 40 is configured to analyze the sensor data to determine locations of rail infrastructure components in addition to the rails and sleepers. The processing unit 40 is configured to modify activation of one or more electrode based weed control units of the at least one electrode based weed control unit 40 comprising utilization of at least one location of the determined locations of the rail infrastructure components.

According to an example, modification of activation of the one or more electrode based weed control unit comprises deactivation of the one or more electrode based weed control units.

According to an example, modification of activation of the one or more electrode based weed units comprises a determination not to activate the one or more electrode based weed control units.

According to an example, modification of activation of the one or more electrode based weed control units comprises a movement of the one or more electrode based weed control units away from the at least one location of the determined locations.

According to an example, the movement comprises a vertical movement.

According to an example, the movement comprises a horizontal movement.

According to an example, each electrode based weed control unit is movably attached to the vehicle via an associated actuator, and wherein the processing unit is configured to control an actuator to move the associated electrode based weed control unit.

According to an example, the processing unit is configured to analyze the sensor data to identify the rail infrastructure components at the determined locations. The at least one location of the determined locations comprises at least one location of an identified rail infrastructure component that is susceptible to damage from activation of an electrode based weed control unit. The at least one location of the determined locations comprises at least one location of an identified rail infrastructure component that is a component that could lead to damage of an electrode based weed control unit. The at least one location of the determined locations comprises at least one location of an identified rail infrastructure component that is a component that could lead to damage of an electrode based weed control unit when activated.

According to an example, the sensor data comprises image data, and identification of the rail infrastructure components comprises image analysis of the image data.

According to an example, the at least one sensor comprises one or more of: a camera; an IR sensor; a LIDAR sensor; a flexible contact sensor; and a radar sensor.

Figure 2:
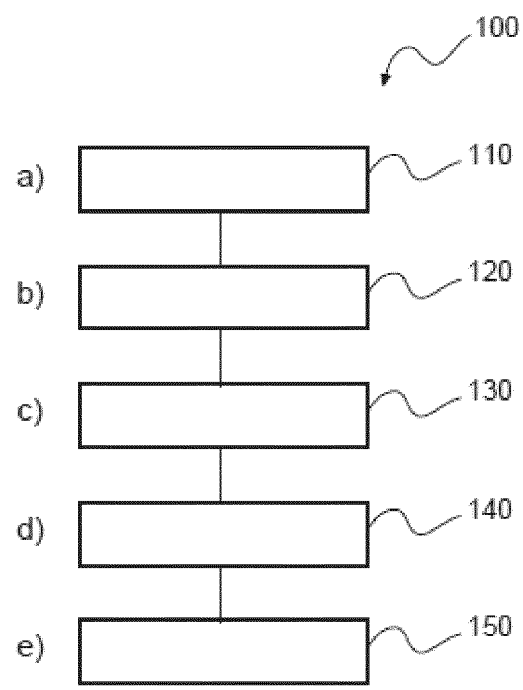
FIG. 2 shows a method of controlling weeds with a railway weed control vehicle.

FIG. 2 shows a method 100 of controlling weeds with a railway weed control vehicle in its basic steps. The method 100 comprises:

in an activating step 110, also referred to as step a), activating at least one weed control unit to control weeds along and around a railway track, wherein the railway track comprises rails and sleepers, and wherein the at least one electrode based weed control unit is mounted to at least one first position of the vehicle;

in an acquiring step 120, also referred to as step b), acquiring sensor data by at least one sensor, the sensor data relating to at least one location along and around the railway track, wherein the at least one sensor is mounted to at least one second position of the vehicle, and wherein with respect to a forward movement direction of the vehicle the at least one second position is in front of the at least one first position;

in a providing step 130, also referred to as step c), providing the sensor data to a processing unit;

in an analyzing step 140, also referred to as step d) analyzing the sensor data by the processing unit to determine locations of rail infrastructure components in addition to the rails and sleepers; and in a modifying step 150, also referred to as step e), modifying by the processing unit activation of one or more electrode based weed control units of the at least one electrode based weed control unit comprising utilization of at least one location of the determined locations of the rail infrastructure components.

According to an example, step e) comprises deactivation of the one or more electrode based weed control units.

In an example, step e) comprises a determination not to activate the one or more electrode based weed control units.

According to an example, step e) comprises a movement of the one or more electrode based weed control units away from the at least one location of the determined locations.

In an example, the movement comprises a vertical movement.

In an example, the movement comprises a horizontal movement.

In an example, each electrode based weed control unit is movably attached to the vehicle via an associated actuator, and wherein the processing unit is configured to control an actuator to move the associated electrode based weed control unit.

In an example, step d) comprises analyzing the sensor data to identity the rail infrastructure components at the determined locations, and wherein the at least one location of the determined locations comprises at least one location of an identified rail infrastructure component that is susceptible to damage from activation of an electrode based weed control unit.

In an example, the at least one sensor comprises a camera, wherein the sensor data comprises image data acquired by the camera, and wherein identification of the rail infrastructure components comprises image analysis of the image data.

In an example, the at least one sensor comprises one or more of: a camera; an IR sensor; a LIDAR sensor; a flexible contact sensor.

The weed control vehicle and method of controlling weeds with a vehicle are now explained in more detail with reference to FIGS. 3-5.

Figure 3:
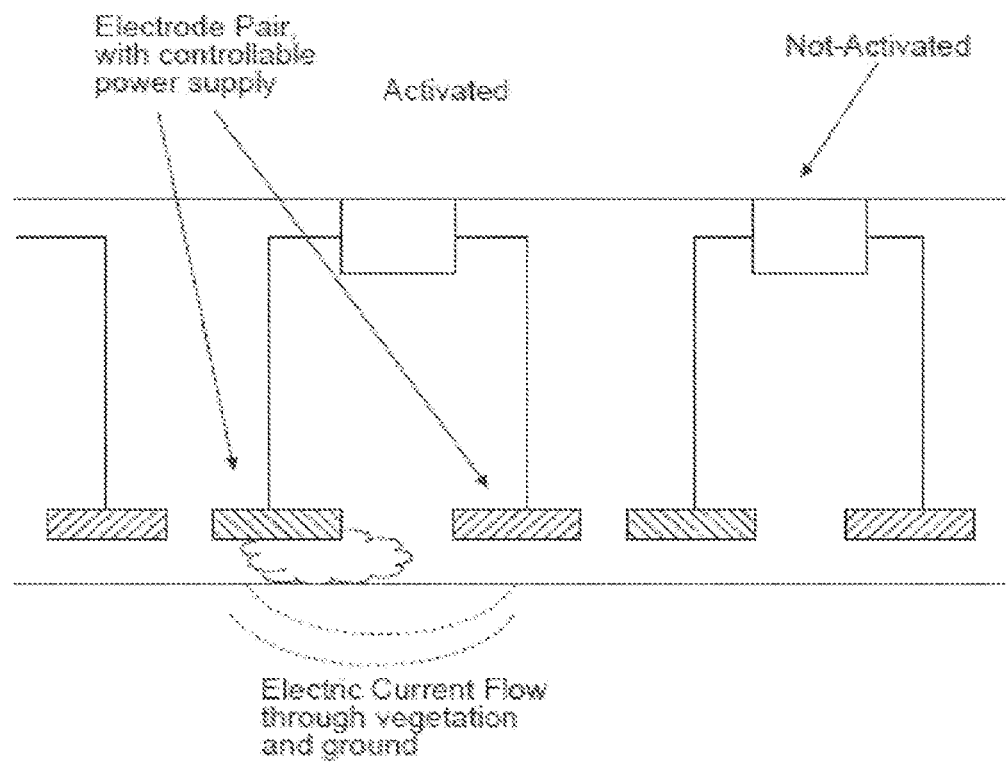
FIG. 3 shows a schematic set up of an example of a number of electrode based weed control units.

FIG. 3 shows an example of a number of weed control units in the form or pairs of high voltage electrodes. Pairs of electrodes are provided to form the individual electrode based weed control units, where a high voltage can be applied between the electrodes forming a pair of electrodes. When an electrode pair is activated electric current flows from one electrode to the other via the weed and the ground including the weed's root. One sub-unit shown can have one electrode pair or indeed have a number of electrode pairs in order to provide for greater resolution and a smaller spatial extent of the application of such high voltage based weed control. The high voltage can be applied in a DC mode for a period of time or in an AC mode for a period of time. The electrodes have flexible end parts, not shown, in the form of metal tape or wires that form a flexible near ground surface (or ground surface) contact with the ground. However, during normal activation robust structural components of electrodes are quite close to the ground, and such then can hit and damage sensitive railway infrastructure components, and activation over or in the vicinity of certain sensitive infrastructure components can also damage such components.

Figure 4:
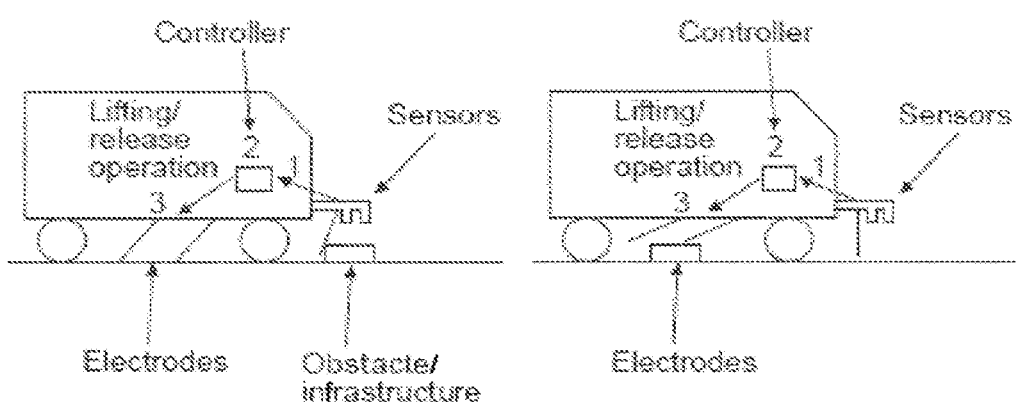
FIG. 4 shows a schematic set up of a detailed example of railway weed control vehicle.

FIG. 4 shows a detailed example of a railway weed control vehicle. FIG. 4 shows the two images of the railway weed control vehicle, with the image of the left showing the vehicle at an earlier time than the image on the right. The railway weed control vehicle is running along a railway track, and is observed from the side in FIG. 4. The railway weed control vehicle is moving in a forward direction, which is in a left to right direction shown in FIG. 4. At the front of the vehicle, a number of sensors are mounted. These sensors sense the ground to enable a determination to be made if sensitive infrastructure components are about to be encountered, or if components are about to be encountered that could damage electrodes if they were positioned ready for activation. A number of touch detectors extending across the front of the vehicle and extending laterally to the sides physically contacts items, and a number of cameras acquire imagery across the width of the track and to the sides of the track that is analyzed with an image processing algorithm. This sensor data is processed to identify infrastructure components being encountered and their size and height above the track level. Under and to the sides of the vehicle are a number of electrode based weed control units, that when activated kill weeds as described above. In the left hand image, image and contact analysis detects that infrastructure will be encountered that could be damaged by the electrodes touching the component and/or activating in the vicinity of the component, and/or that could damage the electrodes. In the left hand image, there are weeds under and around the vehicle (not shown) and the electrodes are being activated to kill the weeds by passing current at high potential through the plants and the ground including the root of the weeds. In the right hand image, the vehicle has moved forward however on the basis of the analyzed sensor data a processing unit of the vehicle has modified activation of the electrode based weed control units that would encounter the infrastructure component by causing an actuator to lift the electrodes over the component and at the same time the electrodes have been deactivated.

Continuing with FIG. 4, the railway weed control train has a GPS unit that determines where the train is, which can be augmented by image processing derived information and/or movement based information provided from knowledge of the speed of the train and/or using inertial navigation based sensors. Thus, as any point in time the processing unit of the weed control trains knows over what part of the ground the electrode based weed control units are located.

As discussed above, the GPS coordinates of weeds can be provided to the weed control train that then uses its own GPS unit to activate electrodes where required. However, the imagery acquired by the cameras of the railway weed control, that is used to identify infrastructure components, is also analyzed to determine if weeds are present, their locations and what types of weeds they are. Thus, the images are provided to the processing unit, which processes the images to determine if weeds are present, what those weeds are and if so their location on the ground can be determined. Then as the train moves forward the electrodes can operate to kill the weeds, where the electrodes can operate differently depending upon what weeds have been identified. This imagery is similarly analyzed to identify infrastructure components, enabling activation of the units to be modified accordingly in order that these components are nor damaged, and/or the electrodes are not damaged. Thus, in addition to determining to modify activation so as not to damage infrastructure around the railway track and/or not to damage the electrode used weed control units the image analysis can determine a weed type, and this can be used to change the current and/or voltage being applied in order to account for the different weed types encountered. This ensures that easy to kill weeds can be controlled with a lower power setting than more difficult to control weeds.

Regarding the image processing to determine if weeds are present, the processing unit analyses an image to determine the areas within the image where vegetation is to be found. Vegetation can be detected based on the shape of features within acquired images, where for example edge detection software is used to delineate the outer perimeter of objects and the outer perimeter of features within the outer perimeter of the object itself. A database of vegetation imagery can be used in helping determine if a feature in imagery relates to vegetation or not, using for example a trained machine learning algorithm such as an artificial neural network or decision tree analysis. The camera can acquire multi-spectral imagery, with imagery having information relating to the colour within images, and this can be used alone, or in combination with feature detection to determine where in an image vegetation is to be found. Similarly, a trained machine learning algorithm is used to identify infrastructure components, with a touch sensor helping that identification by providing information relating to the actual size of the component.

With respect to the weed detection machine learning analyzer, images of specific weeds are acquired, with information also relating to the size of weeds being used. Information relating to a geographical location in the world, where such a weed is to be found and information relating to a time of year when that weed is to be found, including when in flower etc. can be tagged with the imagery. The names of the weeds can also be tagged with the imagery of the weeds. The machine learning analyzer, which can be based on an artificial neural network or a decision tree analyzer, is then trained on this ground truth acquired imagery. In this way, when a new image of vegetation is presented to the analyzer, where such an image can have an associated time stamp such as time of year and a geographical location such as Germany or South Africa tagged to it, the analyzer determines the specific type of weed that is in the image through a comparison of imagery of a weed found in the new image with imagery of different weeds it has been trained on, where the size of weeds, and where and when they grow can also be taken into account. The specific location of that weed type on the ground within the environment, and its size, can therefore be determined. The infrastructure component detection and identification machine learning algorithm has similarly been trained on the basis of imagery of components to be found around railway tracks, and can be trained using imagery of animals such as cats, dogs, rabbits etc. in order that mitigating action call be taken in order that animals are not electrocuted, thereby providing for animal welfare to the extent possible. Other types of sensor and image processing can be used to detect and identify weeds, and other types of sensor and image processing can be used to detect and identify railway infrastructure components, such as the processing of data from radar or lidar based sensor systems. A touch sensor, can be used to augment the image processing and can be useful when a robust component is located within a clump of weeds, and can not be imaged. For example, a large lump of metal could be on the track with weeds growing around and over it. Image processing of a camera cannot then be used to identify, and in some cases processing of a lidar image can be used to detect and identify the metal object. However, the touch sensor provides a simple way to determine that there is an object present that would damage electrodes, and appropriate action such as lifting the electrodes over the object and/or to one side of the object can be undertaken. When being moved, the electrode based weed control units could also be deactivated.

Because the weed control train is itself determining from acquired imagery the location and types of weed, the exact geographical location of the weed is then not then required to be determined. Also, because the weed control train is itself determining from acquired imagery the location and types of infrastructure components, the exact geographical location of the components is then not then required to be determined. Rather, on the basis of a relative spacing between the sensors (e.g. cameras) and the electrode based weed control units, along with knowledge of the forward motion of the weed control train (its speed), once a weed/component is located and identified, at a later time the electrode based weed control units can be activated at that location to kill the weed or the activation modified in order that sensitive infrastructure components are not damaged. Thus for example, if the total processing time and priming electrode based weed control units for activation takes 0.2s, 0.4s, or 0.8s for a train travelling at 25 m/s, the cameras must be spaced forward of the electrode based weed control units by 5m, 10m or 20m for this train velocity. A reduction in train velocity enables the separation to be reduced. In addition, the cameras that are acquiring the imagery can have very short exposure times in order that image smear due to movement of the train during the exposure time is minimized. This can be by various means, including the use of cameras with short exposure times or short pulsed illumination via for example lasers or LEDs in combination with filters for example. However, the train can use a GPS system and/or inertial navigation system and/or image analysis to determine an exact geographical location of weeds and infrastructure components and the electrode based weed control units can have associated location determining means, such as a GPS system and/or inertial navigation system and/or image based system that can be used to provide the exact position of the units. Thus, a front carriage of a train can have the cameras that acquire imagery from which infrastructure components and weeds can be identified and located along with GPS data, then a rear carriage of a train that could be many tens or hundreds of metres behind the front carriage can have the weed control units. Then, the electrode based weed control units can be activated at the correct positions again using GPS data to kill weeds or have their activation modified in order not to damage infrastructure components, even if the train becomes shorter or longer due to going up or down hill.

Figure 5:
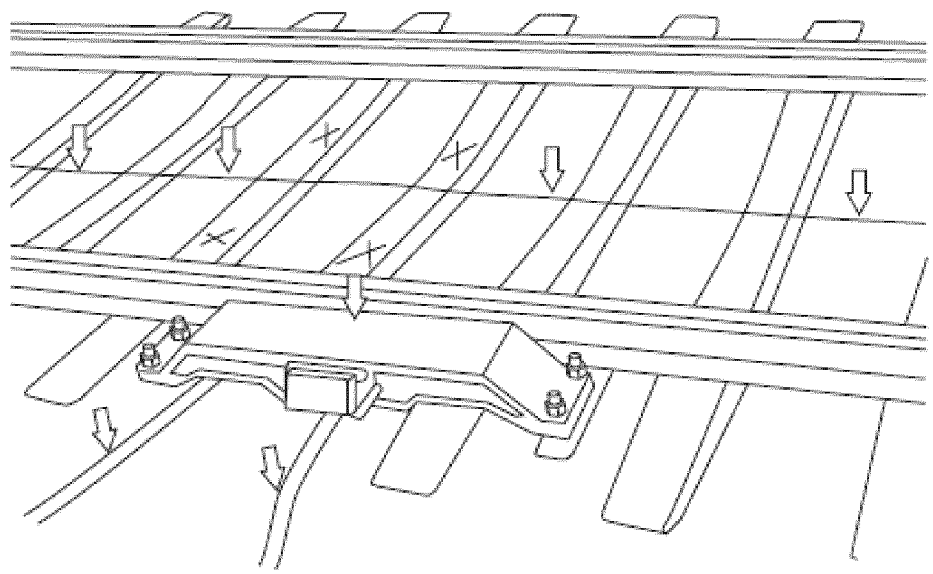
FIG. 5 shows an image of a railway track with sensitive infrastructure components.

FIG. 5 shows examples of sensitive infrastructure components around a railway track, with the presently described railway weed control train being able to control using electrode based weed control units without damaging these infrastructure components.

Image Processing to Enable Analysis to Determine a Weed Type (Infrastructure Component Type)

A specific example of how an image is processed, and determined to be suitable for image processing in order that a type of weed (infrastructure component) can be determined is now described:

1. A digital image—in particular a colored image—of a weed (infrastructure component) is captured.
2. Areas with a predefined color and texture within the digital image are contoured within a boundary contour. Typically, one may expect one contoured area from one weed plant (infrastructure component). Such a detection or determining process detects boundaries of relevant areas of the digital image. During this process at least one contoured area is built comprising pixels relating to the weed (infrastructure component) within a boundary contour. However, more than one contoured area may be determined, if an infrastructure component has sub-parts and if a weed has different sub-parts.
3. Determining if the boundary contour covers a large enough area, and determining a sharpness (e.g. degree of focus) of the image data within the boundary contour. This firstly ensures that there will be sufficient image data upon which a determination can be made as to the type of weed (type of infrastructure component), and secondly determines that a minimum quality of the digital image will be satisfied in order that the type of weed (type of infrastructure component) can be made.
4. If both criteria in 3) are satisfied, the digital image, and specifically that within the boundary contour is sent to the processing unit for image analysis by the artificial neural network to determine the type of weed (type of infrastructure component) as described above.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A railway weed control vehicle, comprising:
   at least one electrode based weed control unit;
   at least one sensor; and
   a processing unit;
   wherein the at least one electrode based weed control unit is mounted to at least one first position of the vehicle;
   wherein the at least one sensor is mounted to at least one second position of the vehicle, wherein with respect to a forward movement direction of the vehicle the at least one second position is in front of the at least one first position;
   wherein activation of the at least one weed control unit is used to control weeds along and around a railway track, wherein the railway track comprises rails and sleepers;
   wherein the at least one sensor is configured to acquire sensor data relating to at least one location along and around the railway track;
   wherein the at least one sensor is configured to provide the sensor data to the processing unit;
   wherein the processing unit is configured to analyze the sensor data to determine locations of rail infrastructure components in addition to the rails and sleepers;
   wherein, the processing unit is configured to modify activation of one or more electrode based weed control units of the at least one electrode based weed control unit comprising utilization of at least one location of the determined locations of the rail infrastructure components;
   wherein modification of activation of the one or more electrode based weed control units comprises a movement of the one or more electrode based weed control units away from the at least one location of the determined locations; and
   wherein the movement comprises a horizontal movement at the underside of the vehicle.

2. The railway weed control vehicle according to claim 1, wherein modification of activation of the one or more electrode based weed control units comprises deactivation of the one or more electrode based weed control units.

3. The railway weed control vehicle according to claim 1, wherein modification of activation of the one or more electrode based weed control units comprises a determination not to activate the one or more electrode based weed control units.

4. The railway weed control vehicle according to claim 1, wherein the movement comprises a vertical movement.

5. The railway weed control vehicle according to claim 1, wherein each of the at least one electrode based weed control unit is movably attached to the vehicle via an associated actuator, and wherein the processing unit is configured to control an actuator to move the associated electrode based weed control unit.

6. The railway weed control vehicle according to claim 1, wherein the processing unit is configured to analyze the sensor data to identify the rail infrastructure components at the determined locations, and wherein the at least one location of the determined locations comprises locations of identified rail infrastructure components that are susceptible to damage from activation of the at least one electrode based weed control unit.

7. The railway weed control vehicle according to claim 6, wherein the sensor data comprises image data, and wherein identification of the rail infrastructure components comprises image analysis of the image data.

8. The railway weed control vehicle according to claim 1, wherein the at least one sensor comprises one or more of: a camera; an IR sensor; a LIDAR sensor; a flexible contact sensor; and a radar sensor.

9. A method of controlling weeds with a railway weed control vehicle, the method comprising:
   a) activating at least one weed control unit to control weeds along and around a railway track, wherein the railway track comprises rails and sleepers, and wherein the at least one electrode based weed control unit is mounted to at least one first position of the vehicle;
   b) acquiring sensor data by at least one sensor, the sensor data relating to at least one location along and around the railway track, wherein the at least one sensor is mounted to at least one second position of the vehicle, and wherein with respect to a forward movement direction of the vehicle the at least one second position is in front of the at least one first position;
   c) providing the sensor data to a processing unit;
   d) analyzing by the processing unit the sensor data to determine locations of rail infrastructure components in addition to the rails and sleepers; and
   e) modifying by the processing unit activation of one or more electrode based weed control units of the at least one electrode based weed control unit comprising utilization of at least one location of the determined locations of the rail infrastructure components,
   wherein modification of activation of the one or more electrode based weed control units comprises a movement of the one or more electrode based weed control units away from the at least one location of the determined locations; and
   wherein the movement comprises a horizontal movement at the underside of the vehicle.

10. The method according to claim 9, wherein step e) comprises deactivation of the one or more electrode based weed control units.

11. A non-transitory computer-readable storage medium comprising executable instructions for controlling a vehicle, which when executed by a processor, cause the processor to perform the following steps:
   activating at least one weed control unit to control weeds along and around a railway track, wherein the railway track comprises rails and sleepers, and wherein the at least one electrode based weed control unit is mounted to at least one first position of the vehicle;
   acquiring sensor data by at least one sensor, the sensor data relating to at least one location along and around the railway track, wherein the at least one sensor is mounted to at least one second position of the vehicle, and wherein with respect to a forward movement direction of the vehicle the at least one second position is in front of the at least one first position;

providing the sensor data to a processing unit;

analyzing by the processing unit the sensor data to determine locations of rail infrastructure components in addition to the rails and sleepers; and modifying by the processing unit activation of one or more electrode based weed control units of the at least one electrode based weed control unit comprising utilization of at least one location of the determined locations of the rail infrastructure components wherein modification of activation of the one or more electrode based weed control units comprises a movement of the one or more electrode based weed control units away from the at least one location of the determined locations; and wherein the movement comprises a horizontal movement at the underside of the vehicle.

12. The non-transitory computer-readable storage medium of claim 11, wherein the executable instructions, when executed by the processor in connection with the step of modifying activation of the one or more electrode based weed control units, cause the processor to perform the step of deactivating the one or more electrode based weed control units.

* * * * *